(12) United States Patent
Konda et al.

(10) Patent No.: US 11,661,725 B2
(45) Date of Patent: May 30, 2023

(54) LOADING MACHINE CONTROL DEVICE AND CONTROL METHOD

(71) Applicant: Komatsu Ltd., Tokyo (JP)

(72) Inventors: Tomoki Konda, Tokyo (JP); Yusuke Saigo, Tokyo (JP); Kazuhiro Hatake, Tokyo (JP)

(73) Assignee: Komatsu Ltd., Tokyo (JP)

( * ) Notice: Subject to any disclaimer, the term of this patent is extended or adjusted under 35 U.S.C. 154(b) by 414 days.

(21) Appl. No.: 16/644,265

(22) PCT Filed: Oct. 2, 2018

(86) PCT No.: PCT/JP2018/036939
§ 371 (c)(1),
(2) Date: Mar. 4, 2020

(87) PCT Pub. No.: WO2019/069947
PCT Pub. Date: Apr. 11, 2019

(65) Prior Publication Data
US 2020/0199853 A1 Jun. 25, 2020

(30) Foreign Application Priority Data
Oct. 4, 2017 (JP) .............................. JP2017-194678

(51) Int. Cl.
*E02F 9/26* (2006.01)
*E02F 3/32* (2006.01)
(Continued)

(52) U.S. Cl.
CPC ................ *E02F 9/265* (2013.01); *E02F 3/32* (2013.01); *B60Y 2200/412* (2013.01);
(Continued)

(58) Field of Classification Search
CPC ... E02F 3/32; E02F 3/435; E02F 3/437; E02F 9/2004; E02F 9/2033; E02F 9/205;
(Continued)

(56) References Cited

U.S. PATENT DOCUMENTS 6,223,110 B1 4/2001 Rowe et al.
6,377,872 B1 * 4/2002 Struckman .............. E02F 9/205
700/258

(Continued)

FOREIGN PATENT DOCUMENTS

EP 3409849 12/2018
JP A-52-064105 5/1977
(Continued)

*Primary Examiner* — Tyler J Lee
(74) *Attorney, Agent, or Firm* — Fish & Richardson P.C.

(57) ABSTRACT

A loaded machine information acquisition unit acquires position information and azimuth direction information of a transport vehicle. An earth removal position-specifying unit specifies an earth removal position for loading a load target onto the transport vehicle, based on the position information and the azimuth direction information. A bucket position-specifying unit specifies a position of a bucket. An operation signal generation unit generates an operation signal for moving the bucket from the specified position to the earth removal position.

10 Claims, 11 Drawing Sheets

(51) Int. Cl.
*E02F 3/43* (2006.01)
*E02F 9/20* (2006.01)
*E02F 9/22* (2006.01)

(52) U.S. Cl.
CPC .............. *E02F 3/435* (2013.01); *E02F 9/2004* (2013.01); *E02F 9/2296* (2013.01)

(58) Field of Classification Search
CPC ....... E02F 9/2054; E02F 9/2296; E02F 9/265; B60Y 2200/412
See application file for complete search history.

(56) References Cited

U.S. PATENT DOCUMENTS

| | | | |
|---|---|---|---|
| 6,539,294 B1* | 3/2003 | Kageyama | E02F 9/2045 |
| | | | 701/25 |
| 6,691,010 B1 | 2/2004 | Guy | |
| 6,778,097 B1 | 8/2004 | Kajita et al. | |
| 8,615,110 B2* | 12/2013 | Landes | G06V 20/56 |
| | | | 701/19 |
| 9,945,095 B2* | 4/2018 | Arimatsu | E02F 3/435 |
| 2013/0211712 A1 | 8/2013 | Takeda | |
| 2013/0325208 A1 | 12/2013 | Osagawa et al. | |
| 2014/0046540 A1 | 2/2014 | Ruth | |
| 2014/0261152 A1 | 9/2014 | Tanaka et al. | |
| 2015/0178859 A1 | 6/2015 | Takeda | |
| 2015/0315909 A1* | 11/2015 | Liu | E02F 3/181 |
| | | | 37/189 |
| 2016/0224026 A1 | 8/2016 | Hamada et al. | |
| 2016/0251824 A1* | 9/2016 | Arimatsu | E02F 9/2296 |
| | | | 701/50 |

FOREIGN PATENT DOCUMENTS

| | | |
|---|---|---|
| JP | A-11-132071 | 5/1999 |
| JP | 11247231 | 9/1999 |
| JP | 2002115271 | 4/2002 |
| JP | 2002332655 | 11/2002 |
| JP | 2012022611 | 2/2012 |
| JP | 2012113429 | 6/2012 |
| WO | WO2013058247 | 4/2013 |
| WO | WO2015025369 | 2/2015 |
| WO | WO2015087382 | 6/2015 |
| WO | WO2015087430 | 6/2015 |
| WO | WO2017131194 | 8/2017 |

* cited by examiner

LOADING MACHINE CONTROL DEVICE AND CONTROL METHOD

CROSS-REFERENCE TO RELATED APPLICATIONS

This application claims priority to International Application No. PCT/JP2018/036939 filed on Oct. 2, 2018, which claims priority to Japanese Patent Application No. 2017-194678, filed on Oct. 4, 2017. The contents of the prior applications are incorporated herein in their entirety.

TECHNICAL FIELD

The present invention relates to a loading machine control device and a control method which control a loading machine at a work site where the loading machine and a transport vehicle are disposed.

BACKGROUND ART

PTL 1 and PTL 2 disclose a technique for designating an excavation position and an earth removal position and automatically operating a hydraulic shovel.

CITATION LIST

Patent Literature

[PTL 1] Japanese Unexamined Patent Application, First Publication No. 2002-115271
[PTL 2] Japanese Unexamined Patent Application, First Publication No. 2002-332655

DISCLOSURE OF INVENTION

Technical Problem

It is desirable to omit designation of an earth removal position in order to improve the efficiency of automatic control.

An object of an aspect of the present invention is to provide a loading machine control device and a control method capable of automatically operating a loading machine without designating an earth removal position.

Solution to Problem

According to a first aspect of the present invention, a loading machine control device is provided that controls a loading machine including a swing body swinging around a center of swing and a work equipment attached to the swing body and containing a bucket, the loading machine control device including a loaded machine information acquisition unit acquiring position information and azimuth direction information of a loaded machine; an earth removal position-specifying unit specifying an earth removal position for loading earth onto the loaded machine, based on the position information and the azimuth direction information; a bucket position-specifying unit specifying a position of the bucket when an earth removal instruction signal for moving the bucket to the earth removal position has been input; and an operation signal generation unit generating an operation signal for moving the bucket from the specified position to the earth removal position.

Advantageous Effects of Invention

According to the aspect, the loading machine control device is capable of automatically operating the loading machine without designating the earth removal position.

BEST MODE FOR CARRYING OUT THE INVENTION

First Embodiment

Figure 1:
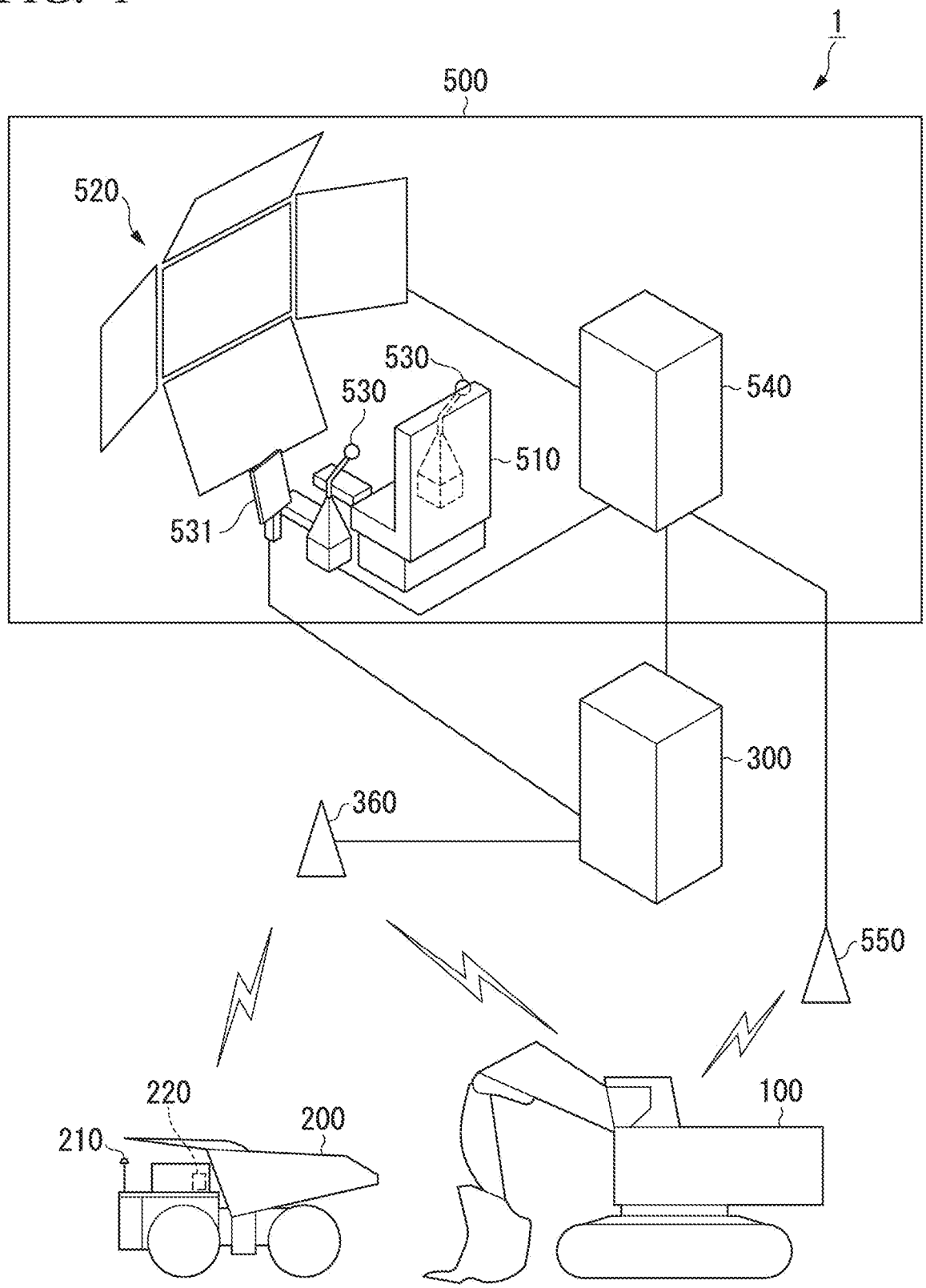
FIG. 1 is a schematic view showing the configuration of a remote operation system according to a first embodiment.

<<Work System>>
FIG. 1 is a schematic view showing the configuration of a remote operation system according to a first embodiment.

A work system 1 includes a loading machine 100; one or a plurality of transport vehicles 200 which are loaded machines; a management device 300; and a remote operation room 500. The loading machine 100 and the transport vehicle 200 move to a work site (for example, a mine or quarry). The remote operation room 500 is provided at a location (for example, in a town or the work site) apart from the work site.

The transport vehicle 200 travels unmanned based on control information received from the management device 300. The transport vehicle 200 is connected to the management device 300 by communication via an access point 360. The management device 300 acquires the position and azimuth direction of the transport vehicle 200 from the transport vehicle 200, and based thereon, generates course information to be used to allow the transport vehicle 200 to travel. The management device 300 transmits the course information to the transport vehicle 200. The transport vehicle 200 travels unmanned based on the received course information. Namely, the work system 1 includes an unmanned transport system containing the transport vehicle 200 and the management device 300. The access point 360 is used for communication of the unmanned transport system.

The management device 300 receives an instruction signal for the transport vehicle 200 from the loading machine 100 and the remote operation room 500, and transmits the instruction signal to the transport vehicle 200. The loading machine 100 is connected to the management device 300 by communication via the access point 360. In addition, the remote operation room 500 is connected to the management device 300 via a network. An entry instruction signal and a departure instruction signal are examples of the instruction signal for the transport vehicle 200 received from the loading machine 100 and the remote operation room 500. The entry instruction signal is a signal for instructing the transport vehicle 200 to enter from a standby point P1 to a loading point P3. The departure instruction signal is a signal for instructing the transport vehicle 200 to depart from the loading point P3 and exit from a loading place A1 upon the completion of loading.

The loading machine 100 is remotely operated based on an operation signal transmitted from the remote operation room 500. The loading machine 100 is connected to the remote operation room 500 by communication via an access point 350. A first operation device 530 of the remote operation room 500 is operated by an operator to receive an operation signal of the loading machine 100, and a control device 540 transmits an operation signal to the management device 300. The loading machine 100 operates based on the operation signal received from the remote operation room 500. Namely, the work system 1 includes a remote operation system formed of the loading machine 100 and the remote operation room 500. The access point 350 is used for communication of the remote operation system.

<<Transport Vehicle>>

The transport vehicle 200 according to the first embodiment is an unmanned dump truck traveling unmanned on a set travel path. Note that the transport vehicle 200 according to other embodiments may be a transport vehicle other than a dump truck.

The transport vehicle 200 includes a position and azimuth direction detector 210 and a control device 220.

The position and azimuth direction detector 210 detects the position and azimuth direction of the transport vehicle 200. The position and azimuth direction detector 210 includes two receivers receiving positioning signals from an artificial satellite forming a global navigation satellite system (GNSS). A global positioning system (GPS) is an example of the GNSS. Two receivers are each installed on the transport vehicle 200 at different positions. The position and azimuth direction detector 210 detects the position of a representative point (origin of a vehicle body coordinate system, for example, the position of the center of a rear axle of the transport vehicle 200) of the transport vehicle 200 in a site coordinate system, based on the positioning signals received with the receivers.

The position and azimuth direction detector 210 calculates the facing azimuth direction of the transport vehicle 200 as the relationship of the installation position of one receiver with the installation position of the other receiver, using the positioning signals received with two receivers. Note that other embodiments are not limited to having such configuration, for example, the transport vehicle 200 may include an inertial measurement unit (IMU) and calculate an azimuth direction based on a measurement result of the inertial measurement unit. In this case, a drift of the inertial measurement unit may be corrected based on a travel trajectory of the transport vehicle 200. If an azimuth direction is calculated using the inertial measurement unit, the transport vehicle 200 may include one receiver.

The control device 220 transmits the position and azimuth direction detected by the position and azimuth direction detector 210 to the management device 300. The control device 220 receives course information and an instruction signal from the management device 300. The control device 220 causes the transport vehicle 200 to travel or raises or lowers a vessel of the transport vehicle 200 based on the received course information and the received instruction signal.

<<Loading Machine>>

Figure 2:
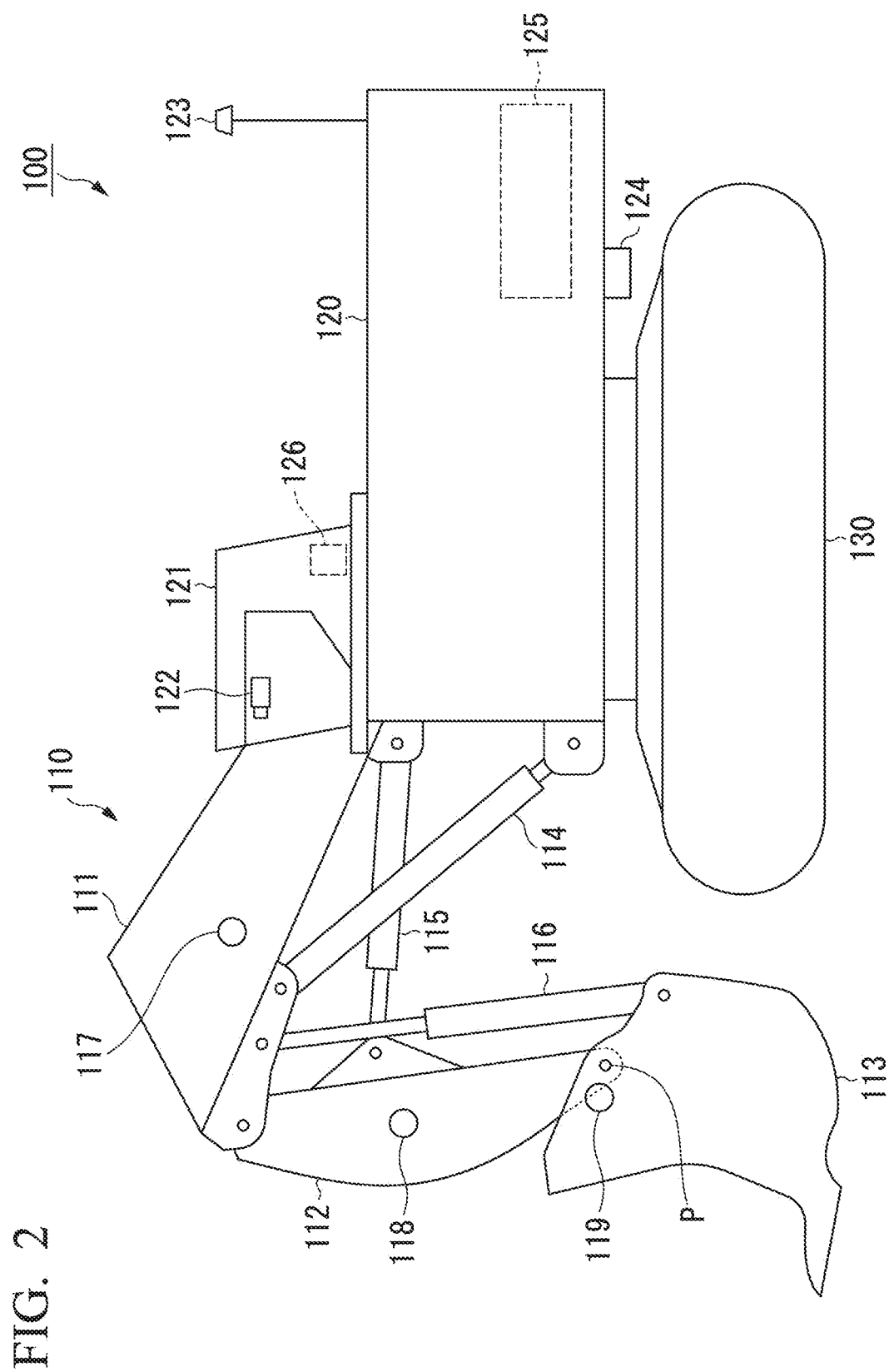
FIG. 2 is an exterior view of a loading machine according to the first embodiment.

FIG. 2 is an exterior view of the loading machine according to the first embodiment.

The loading machine 100 according to the first embodiment is a hydraulic shovel. Note that the loading machine 100 according to other embodiments may be a loading machine other than a hydraulic shovel. In addition, the loading machine 100 shown in FIG. 2 is a face shovel, but may be a backhoe shovel or rope shovel.

The loading machine 100 includes a travel body 130; a swing body 120 supported by the travel body 130; and a work equipment 110 operated by oil pressure and supported by the swing body 120. The swing body 120 is supported so as to be swingable around a center of swing.

The work equipment 110 includes a boom 111; an arm 112; a bucket 113; a boom cylinder 114; an arm cylinder 115; a bucket cylinder 116; a boom angle sensor 117; an arm angle sensor 118; and a bucket angle sensor 119.

A base end portion of the boom 111 is attached to the swing body 120 with a pin.

The arm 112 connects the boom 111 to the bucket 113. A base end portion of the arm 112 is attached to a tip portion of the boom 111 with a pin.

The bucket 113 includes a blade for excavating earth, or the like and a container for accommodating the excavated earth. A base end portion of the bucket 113 is attached to a tip portion of the arm 112 with a pin.

The boom cylinder 114 is a hydraulic cylinder for operating the boom 111. A base end portion of the boom cylinder 114 is attached to the swing body 120. A tip portion of the boom cylinder 114 is attached to the boom 111.

The arm cylinder 115 is a hydraulic cylinder for driving the arm 112. A base end portion of the arm cylinder 115 is attached to the boom 111. A tip portion of the arm cylinder 115 is attached to the arm 112.

The bucket cylinder 116 is a hydraulic cylinder for driving the bucket 113. A base end portion of the bucket cylinder 116 is attached to the boom 111. A tip portion of the bucket cylinder 116 is attached to the bucket 113.

The boom angle sensor 117 is attached to the boom 111, and detects the tilted angle of the boom 111.

The arm angle sensor 118 is attached to the arm 112, and detects the tilted angle of the arm 112.

The bucket angle sensor 119 is attached to the bucket 113, and detects the tilted angle of the bucket 113.

The boom angle sensor 117, the arm angle sensor 118, and the bucket angle sensor 119 according to the first embodiment each detect a tilted angle with respect to a ground plane. Note that an angle sensor according to other embodiments is not limited thereto, and may detect a tilted angle with respect to other reference planes. For example, in other embodiments, an angle sensor may detect a relative rotation angle with a potentiometer provided in the base end portion of each of the boom 111, the arm 112, and the bucket 113, or may detect a tilted angle by measuring a cylinder length of each of the boom cylinder 114, the arm cylinder 115, and the bucket cylinder 116 and converting the cylinder length into an angle.

The swing body 120 includes an operation cab 121. An imaging device 122 is provided in an upper portion of the operation cab 121. The imaging device 122 is installed at a forward and upward position inside the operation cab 121. The imaging device 122 captures images of situations in front of the operation cab 121 through a windshield of a front surface of the operation cab 121. An imaging device using a charge-coupled device (CCD) sensor, a complementary metal oxide semiconductor (CMOS) sensor, or the like is an example of the imaging device 122. Note that in other embodiments, the imaging device 122 may not necessarily be provided inside the operation cab 121 but may be provided at a position where the imaging device 122 is capable of capturing images of at least a work target and the work equipment 110.

The loading machine 100 includes the imaging device 122; a position and azimuth direction calculator 123; a tilt measurement instrument 124; a hydraulic device 125; and a control device 126.

The position and azimuth direction calculator 123 calculates the position of the swing body 120 and the facing azimuth direction of the swing body 120. The position and azimuth direction calculator 123 includes two receivers receiving positioning signals from the artificial satellite forming the GNSS. Two receivers are each installed on the swing body 120 at different positions. The position and azimuth direction calculator 123 detects the position of a representative point (origin of a shovel coordinate system) of the swing body 120 in the site coordinate system, based on the positioning signals received with the receivers.

The position and azimuth direction calculator 123 calculates the facing azimuth direction of the swing body 120 as the relationship of the installation position of one receiver with the installation position of the other receiver, using the positioning signals received with two receivers.

The tilt measurement instrument 124 measures the acceleration and the angular speed of the swing body 120, and detects the posture (for example, a roll angle, a pitch angle, and a yaw angle) of the swing body 120 based on a measurement result. The tilt measurement instrument 124 is installed on, for example, a lower surface of the swing body 120. The tilt measurement instrument 124 is capable of using, for example, an inertial measurement unit (IMU).

The hydraulic device 125 includes a working oil tank; a hydraulic pump; and a flow rate control valve. The hydraulic pump is driven by the power of an engine (not showin) to supply working oil to the boom cylinder 114, the arm cylinder 115, and the bucket cylinder 116 via the flow rate control valve. The flow rate control valve has a rod-shaped spool, and adjusts the flow rate of the working oil to be supplied to each of the boom cylinder 114, the arm cylinder 115, and the bucket cylinder 116 using the position of the spool. The spool is driven based on a control command received from the control device 126. Namely, the volume of the working oil to be supplied to each of the boom cylinder 114, the arm cylinder 115, and the bucket cylinder 116 is controlled by the control device 126.

The control device 126 transmits images captured by the imaging device 122, the swing speed, position, and azimuth direction of the swing body 120, the tilted angles of the boom 111, the arm 112, and the bucket 113, the travel speed of the travel body 130, and the posture of the swing body 120 to the remote operation room 500. Hereinbelow, the images, the swing speed, position, and azimuth direction of the swing body 120, the tilted angles of the boom 111, the arm 112, and the bucket 113, the travel speed of the travel body 130, and the posture of the swing body 120 are also referred to as vehicle information. Note that vehicle information in other embodiments is not limited thereto. For example, vehicle information in other embodiments may not contain any one of a swing speed, a position, an azimuth direction, a tilted angle, a travel speed, and a posture, may contain values detected by other sensors, or may contain a value calculated from a detected value.

The control device 126 receives an operation signal from the remote operation room 500. The control device 126 drives the work equipment 110, the swing body 120, or the travel body 130 based on the received operation signal.

<<Management Device>>

Figure 3:
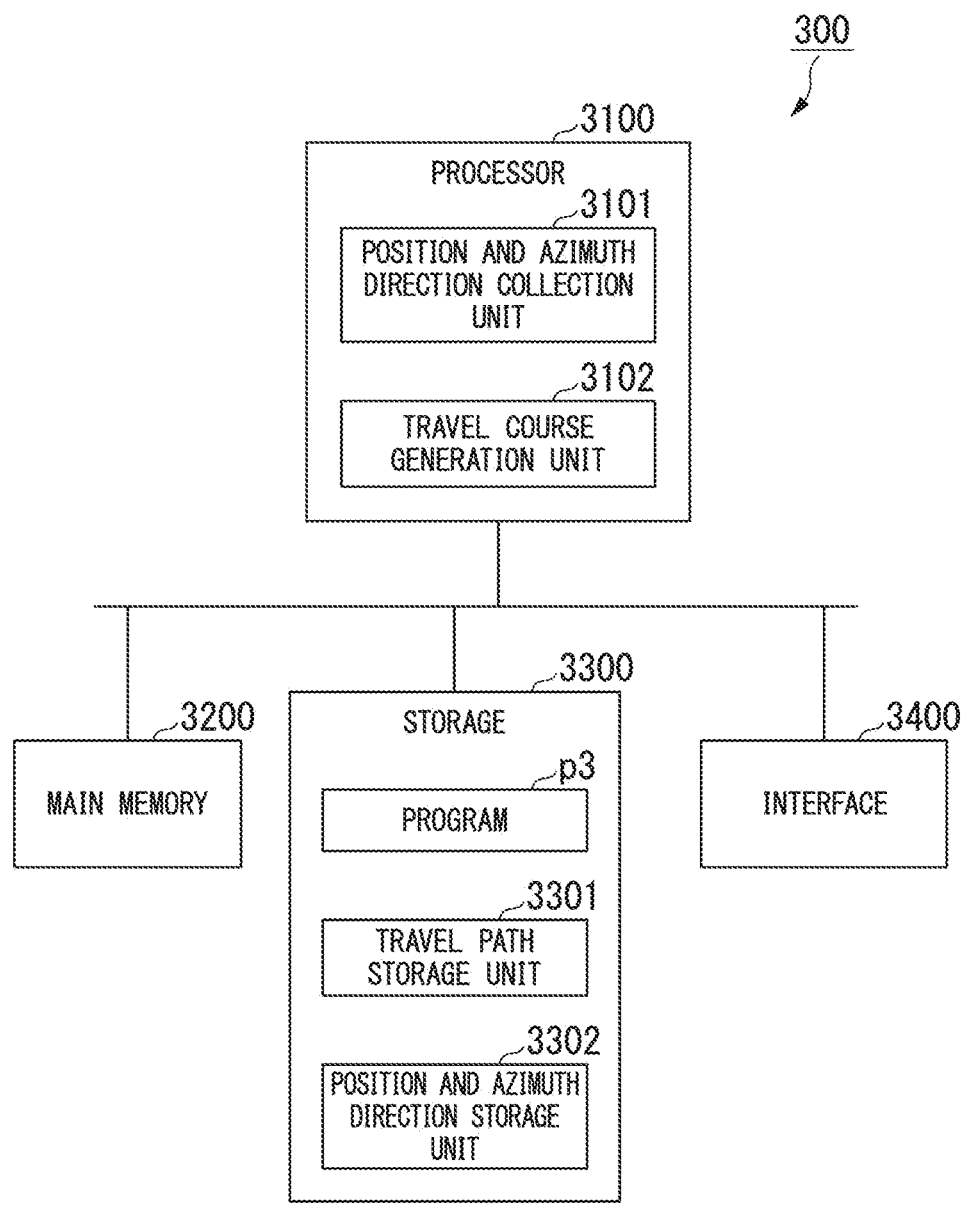
FIG. 3 is a schematic block diagram showing the configuration of a management device according to the first embodiment.

FIG. 3 is a schematic block diagram showing the configuration of the management device according to the first embodiment.

The management device 300 manages the travel of the transport vehicle 200.

The management device 300 is a computer including a processor 3100, a main memory 3200, a storage 3300, and an interface 3400. The storage 3300 stores a program p3. The processor 3100 reads out the program p3 from the storage 3300, loads the program p3 in the main memory 3200, and executes a process according to the program p3. The management device 300 is connected to the network via the interface 3400. The access point 360 is connected to the interface 3400. The management device 300 is wirelessly connected to the loading machine 100 and the transport vehicle 200 via the access point 360.

The storage 3300 has a travel path storage unit 3301 and a position and azimuth direction storage unit 3302 as storage regions. Examples of the storage 3300 are a hard disk drive (HDD), a solid-state drive (SSD), a magnetic disk, a magneto-optical disk, a compact disc read-only memory (CD-ROM), a digital versatile disc read-only memory (DVD-ROM), or a semiconductor memory. The storage 3300 may be an internal medium directly connected to common communication lines of the management device 300, or may be an external medium connected to the management device 300 via the interface 3400. The storage 3300 is a non-transient storage medium.

Figure 4:
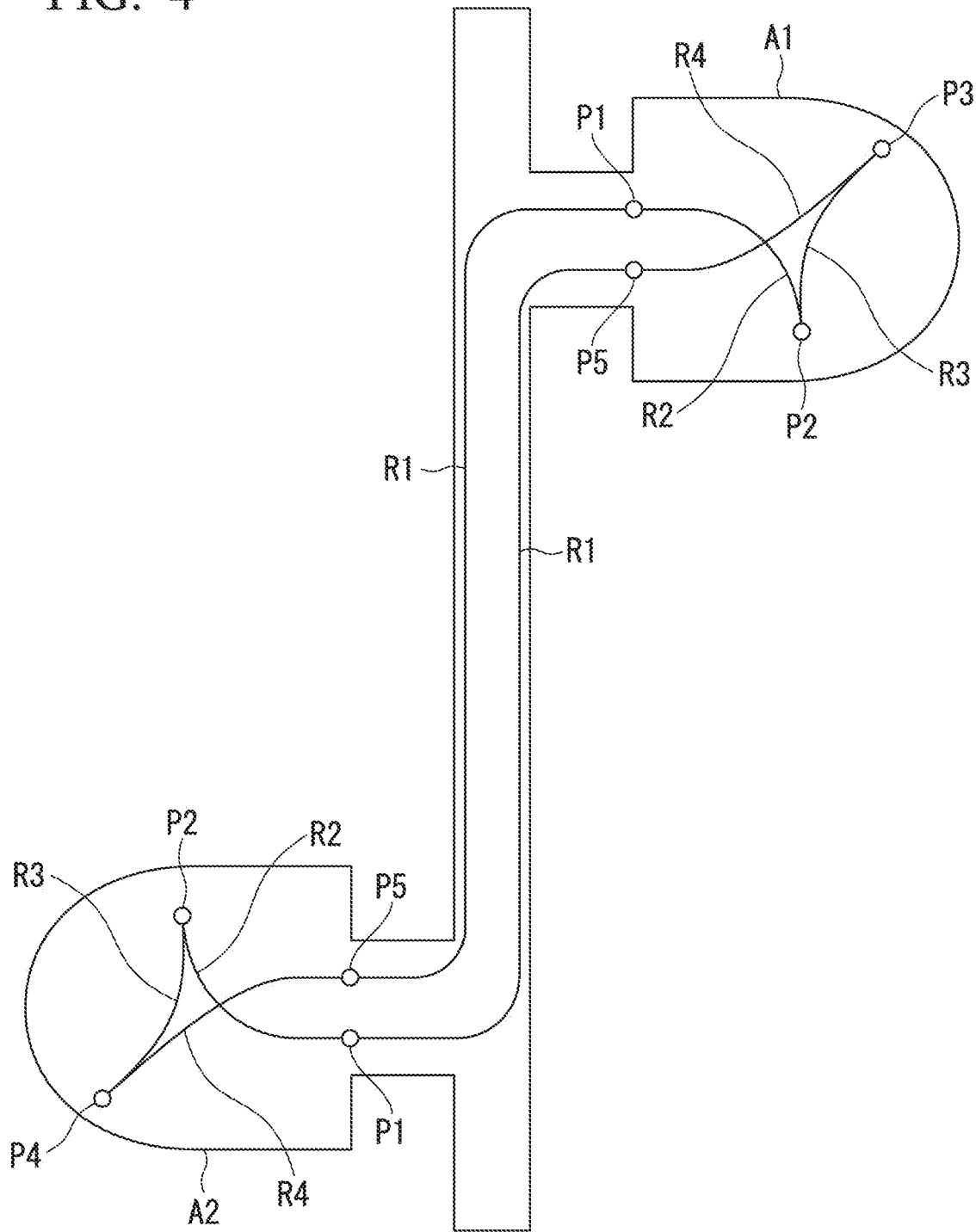
FIG. 4 is a view showing an example of a travel path.

The travel path storage unit 3301 stores a travel path R for each of the transport vehicles 200. FIG. 4 is a view showing an example of the travel path. The travel path R has a predetermined connection path R1 connecting two areas A (for example, the loading place A1 and an earth removal place A2) to each other, and an entry path R2, an approach path R3, and an exit path R4 which are paths within the area A. The entry path R2 is a path connecting the standby point P1, which is one end of the connection path R1, to a predetermined turning point P2 within the area A. The approach path R3 is a path connecting the turning point P2 to the loading point P3 or an earth removal point P4 within the area A. The exit path R4 is a path connecting the loading point P3 or the earth removal point P4 to an exit point P5, which is the other end of the connection path R1, within the area A. The loading point P3 is a point set by an operation initiated by the operator of the loading machine 100. The turning point P2 is a point set in response to the position of the loading point P3 by the management device 300.

The position and azimuth direction storage unit 3302 stores position information and azimuth direction information of each of the transport vehicles 200.

The processor 3100 includes a position and azimuth direction collection unit 3101 and a travel course generation unit 3102 by the execution of the program p3.

The position and azimuth direction collection unit 3101 receives the position information and the azimuth direction information of the transport vehicle 200 from the transport vehicle 200 via the access point 360. The position and azimuth direction collection unit 3101 causes the position and azimuth direction storage unit 3302 to store the received position information and the received azimuth direction information.

The travel course generation unit 3102 generates course information containing information on a region where the transport vehicle 200 is permitted to move, based on the travel path stored in the travel path storage unit 3301 and the position information and the azimuth direction information stored in the position and azimuth direction storage unit 3302. The generated course information is transmitted to the transport vehicle 200. The course information contains position information of locations set at predetermined intervals on the travel path, target speed information of the locations, and travel-permissible region information which does not duplicate travel-permissible area information of other transport vehicles 200.

Until receiving an entry instruction signal from the remote operation room 500, the travel course generation unit 3102 causes the region indicated by the course information not to contain the entry path R2 and the approach path R3. Therefore, the transport vehicle 200 stands by at the standby point P1 until receiving the entry instruction signal. If the travel course generation unit 3102 has received the entry instruction signal, the travel course generation unit 3102 generates course information containing the entry path R2 and the approach path R3 and not containing the exit path R4. Therefore, the transport vehicle 200 departs from the standby point P1, travels to the loading point P3, and stops at the loading point P3. If the travel course generation unit 3102 has received a departure instruction signal, the travel course generation unit 3102 generates course information containing the exit path R4. Note that in the work system 1 according to the embodiment, the transport vehicle 200 stands by at the standby point P1 until receiving an entry instruction signal, but the work system 1 is not limited thereto. For example, in other embodiments, the standby position of the transport vehicle 200 may be the turning point P2, or may be a location in the middle of the entry path R2 or the approach path R3.

<<Remote Operation Room>>

The remote operation room 500 includes an operator seat 510; a display device 520; the first operation device 530; a second operation device 531; and the control device 540.

The display device 520 is disposed in front of the operator seat 510. The display device 520 is positioned in front of the eyes of the operator when the operator has sat in the operator seat 510. The display device 520 may be, as shown in FIG. 1, formed of a plurality of displays arranged side by side, or may be formed of one large display. In addition, the display device 520 may project images onto a curved surface or a spherical surface with a projector or the like.

The first operation device 530 is an operation device for the remote operation system. In response to an operation initiated by the operator, the first operation device 530 generates and outputs an operation signal for the boom cylinder 114, an operation signal for the arm cylinder 115, an operation signal for the bucket cylinder 116, an operation signal for swinging the swing body 120 rightward and leftward, or an operation signal for instructing the travel body 130 to travel forward and rearward, to the control device 540. The first operation device 530 is formed of, for example, a lever, a knob switch, and a pedal. An earth removal instruction signal is generated by operating the knob switch.

The second operation device 531 is operated by the operator to transmit the departure instruction signal to the management device 300. The second operation device 531 is formed of, for example, a touch panel.

The first operation device 530 and the second operation device 531 are disposed in the vicinity of the operator seat 510. The first operation device 530 and the second operation device 531 are positioned within an operable range of the operator when the operator has sat in the operator seat 510.

The control device 540 causes the display device 520 to display the images received from the loading machine 100, and transmits an operation signal indicating an operation of the first operation device 530 to the loading machine 100.

Figure 5:
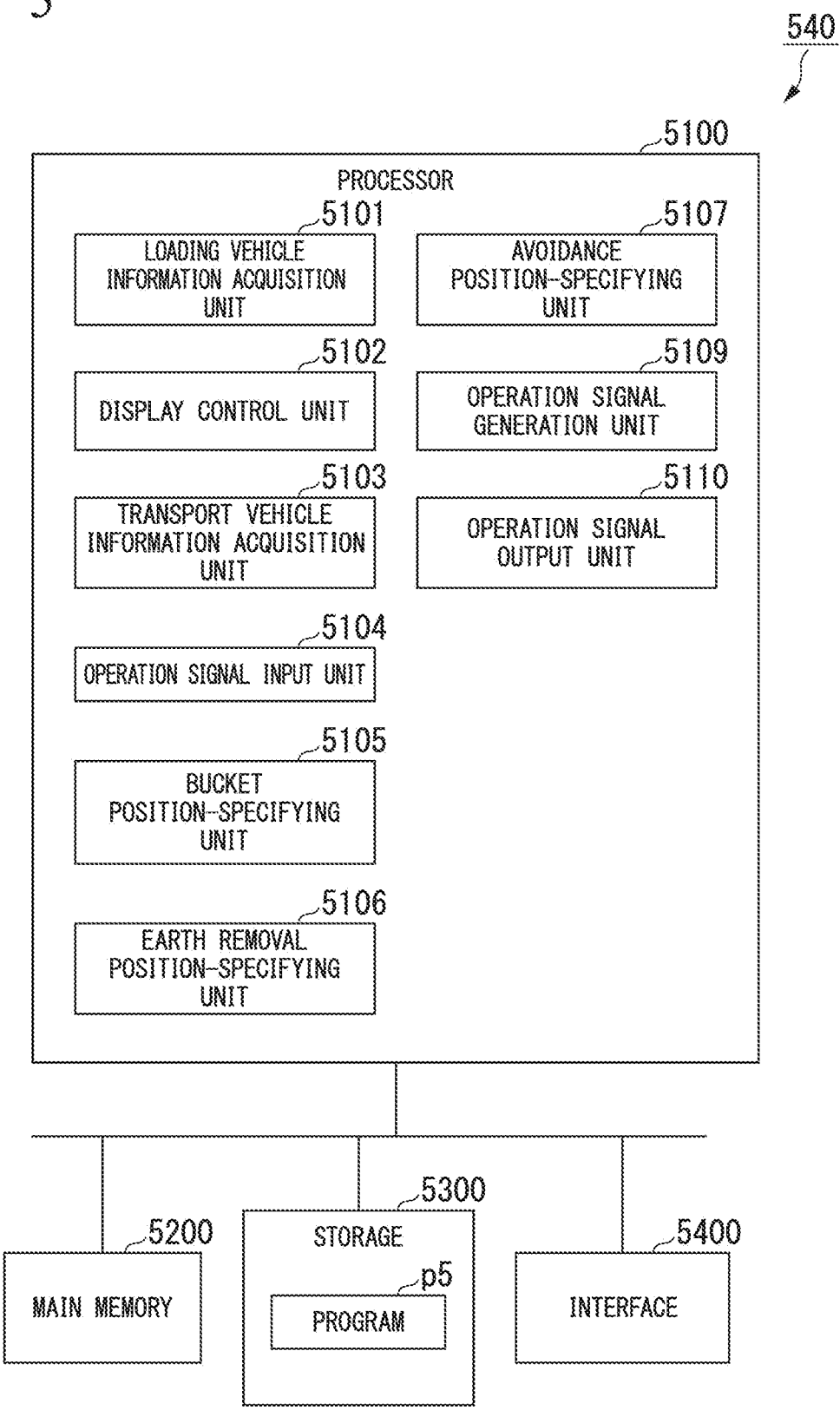
FIG. 5 is a schematic block diagram showing the configuration of a control device of a remote operation room according to the first embodiment.

FIG. 5 is a schematic block diagram showing the configuration of the control device of the remote operation room according to the first embodiment.

The control device 540 is a computer including a processor 5100, a main memory 5200, a storage 5300, and an interface 5400. The storage 5300 stores a program p5. The processor 5100 reads out the program p5 from the storage 5300, loads the program p5 in the main memory 5200, and executes a process according to the program p5. The control device 540 is connected to the network via the interface 5400.

Examples of the storage 5300 are a HDD, a SSD, a magnetic disk, a magneto-optical disk, a CD-ROM, a DVD-ROM, or a semiconductor memory. The storage 5300 may be an internal medium directly connected to common communication lines of the control device 540, or may be an external medium connected to the control device 540 via the interface 5400. The storage 5300 is a non-transient storage medium.

The processor 5100 includes a loading vehicle information acquisition unit 5101, a display control unit 5102, a transport vehicle information acquisition unit 5103, an operation signal input unit 5104, a bucket position-specifying unit 5105, an earth removal position-specifying unit 5106, an avoidance position-specifying unit 5107, an operation signal generation unit 5109, and an operation signal output unit 5110 by the execution of the program p5.

The loading vehicle information acquisition unit 5101 acquires vehicle information from the loading machine 100.

The display control unit 5102 generates display signals for displaying images contained in the vehicle information received by the loading vehicle information acquisition unit 5101, and outputs the display signals to the display device 520.

The transport vehicle information acquisition unit 5103 acquires the position information and the azimuth direction information of each of the transport vehicles 200 from the management device 300. The transport vehicle information acquisition unit 5103 is an example of a loaded machine information acquisition unit acquiring position information and azimuth direction information of a loaded machine.

The operation signal input unit 5104 receives operation signals input from the first operation device 530. The operation signals contain an operation signal for the boom 111, an operation signal for the arm 112, an operation signal for the bucket 113, a swing signal for the swing body 120, a travel signal for the travel body 130, and an earth removal instruction signal for the loading machine 100. The earth removal instruction signal is a signal for instructing automatic earth removal control to cause the bucket 113 to move to the earth removal position and remove earth therefrom.

Figure 6:
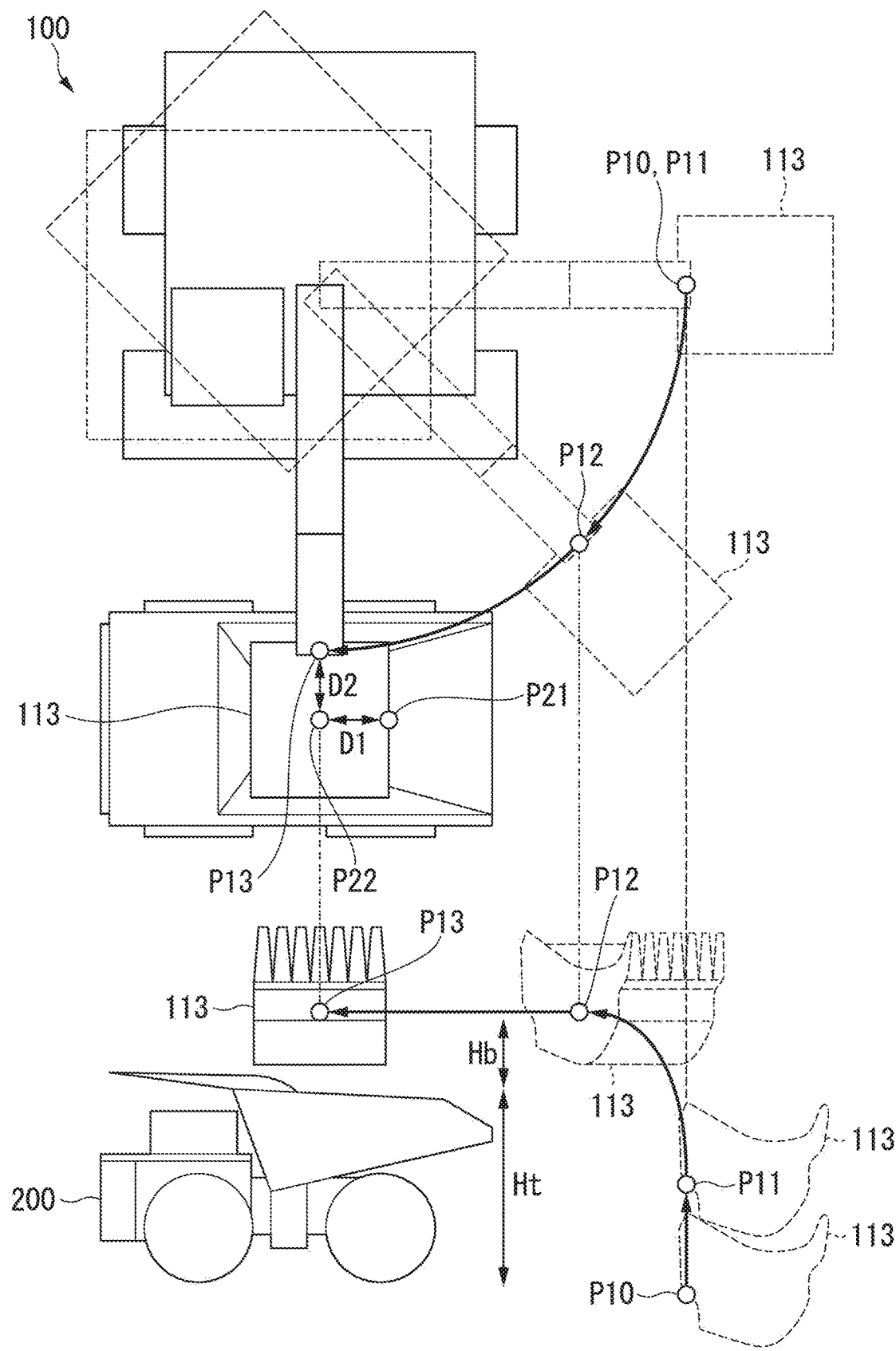
FIG. 6 is a view showing an example of a path of a bucket according to the first embodiment.

The bucket position-specifying unit 5105 specifies a position P of a tip of the arm 112 and a height Hb from the tip of the arm 112 to the lowest point of the bucket 113 in the shovel coordinate system, based on the vehicle information received by the loading vehicle information acquisition unit 5101. The lowest point of the bucket 113 is a point which has the shortest distance from a ground surface in the exterior shape of the bucket 113. Particularly, the bucket position-specifying unit 5105 specifies an excavation completion position P10 as the position P of the tip of the arm 112 when the input of the earth removal instruction signal has been received. FIG. 6 is a view showing an example of a path of a bucket according to the first embodiment. Specifically, based on the tilted angle of the boom 111 and a known length (distance from the pin of the base end portion to the pin of the tip portion) of the boom 111, the bucket position-specifying unit 5105 obtains a vertical component and a horizontal component of the length of the boom 111. Similarly, the bucket position-specifying unit 5105 obtains a vertical component and a horizontal component of the length of the arm 112. The bucket position-specifying unit 5105 specifies a position which is apart by a sum of the vertical components and a sum of the horizontal components of the lengths of the boom 111 and the arm 112 from the position of the loading machine 100 in a direction specified from the azimuth direction and posture of the loading machine 100, as the position P (position P of the pin of the tip portion of the arm 112 shown in FIG. 2) of the tip of the arm 112. In addition, based on the tilted angle of the bucket 113 and a known shape of the bucket, the bucket position-specifying unit 5105 specifies the lowest point of the bucket 113 in a vertical direction, and specifies the height Hb from the tip of the arm 112 to the lowest point.

If the earth removal instruction signal has been input to the operation signal input unit 5104, the earth removal position-specifying unit 5106 specifies an earth removal position P13 based on the position information and the azimuth direction information of the transport vehicle 200 acquired by the transport vehicle information acquisition unit 5103. Namely, the earth removal position-specifying unit 5106 specifies the earth removal position P13 based on position information and azimuth direction information when the transport vehicle 200 has stopped at the loading point P3. The earth removal position-specifying unit 5106 converts a reference position P21 indicated by the position information of the transport vehicle 200 from the site coordinate system to the shovel coordinate system, based on the position, azimuth direction, and posture of the swing body 120 acquired by the loading vehicle information acquisition unit 5101, and specifies an earth removal point P22, which is apart by a distance D1 from the reference position P21 in a direction indicated by the azimuth direction information of the transport vehicle 200. The distance D1 is a known distance between the reference position P21 and the earth removal point P22 on the vessel. The earth removal position-specifying unit 5106 specifies a position which is apart from the specified position P22 by a distance D2 from the center of the bucket 113 to the tip of the arm 112 in a facing direction of the swing body 120 of the loading machine 100, as an in-plane position of the earth removal position P13. The earth removal position-specifying unit 5106 specifies the height of the earth removal position P13 by adding the height Hb from the tip of the arm 112 to the lowest point specified by the bucket position-specifying unit 5105 and a control margin height of the bucket 113 to a height Ht of the transport vehicle 200. Note that in other embodiments, the earth removal position-specifying unit 5106 may specify the earth removal position P13 without adding the control margin height. Namely, the earth removal position-specifying unit 5106 may specify the height of the earth removal position P13 by adding the height Hb to the height Ht.

The avoidance position-specifying unit 5107 specifies an interference avoidance position P12 which is a point where the bucket 113 does not interfere with the transport vehicle 200, based on the earth removal position P13 specified by the earth removal position-specifying unit 5106, the position of the loading machine 100 acquired by the loading vehicle information acquisition unit 5101, and the position and azimuth direction of the transport vehicle 200 acquired by the transport vehicle information acquisition unit 5103. The interference avoidance position P12 is a position which has the same height as the height of the earth removal position P13, at which a distance from the center of swing of the swing body 120 is the same as a distance from the center of swing to the earth removal position P13, and below which the transport vehicle 200 is not present. For example, among positions on a circle specified to have the center of swing of the swing body 120 as a center and a distance between the center of swing and the earth removal position as a radius, the avoidance position-specifying unit 5107 specifies a position at which the exterior shape of the bucket 113 does not interfere with the transport vehicle 200 in plan view and is the closest to the earth removal position P13, as the interference avoidance position P12. The avoidance position-specifying unit 5107 is capable of determining whether or not the transport vehicle 200 and the bucket 113 interfere with each other, based on the position, azimuth direction, and known exterior shape of the transport vehicle 200 and a known shape of the bucket 113. Herein, "the same height" or "the same distance" is not necessarily limited to implying that heights or distances coincide perfectly with each other, but some errors or margins are allowed.

The operation signal generation unit 5109 generates an operation signal for moving the bucket 113 to the earth removal position P13, based on the earth removal position P13 specified by the earth removal position-specifying unit 5106 and the interference avoidance position P12 specified by the avoidance position-specifying unit 5107. Namely, the operation signal generation unit 5109 generates the operation signal so as to enable the bucket 113 to reach the earth removal position P13 from the excavation completion position P10 via a position P11 and the interference avoidance position P12. In addition, the operation signal generation unit 5109 generates the operation signal for the bucket 113 such that the angle of the bucket 113 is not changed even though the boom 111 and the arm 112 are driven.

The operation signal output unit 5110 outputs the operation signal input to the operation signal input unit 5104 or the operation signal generated by the operation signal generation unit 5109, to the loading machine 100.

<<Method>>

The transport vehicle 200 travels along the travel path R and stops at the standby point P1 according to the course information generated by the management device 300. The operator of the loading machine 100 inputs an entry instruction signal to the second operation device 531 by operating the second operation device 531 (for example, by pressing down a predetermined button). The entry instruction signal is transmitted from the second operation device 531 to the management device 300. Accordingly, the management device 300 generates course information indicating the areas of the entry path R2 and the approach path R3. The transport vehicle 200 travels along the approach path R3 and stops at the loading point P3. The operator scoops earth with the bucket 113 of the loading machine 100 by operating the first operation device 530, and generates and outputs an earth removal instruction signal by operating the knob switch of the first operation device 530.

Figure 7:
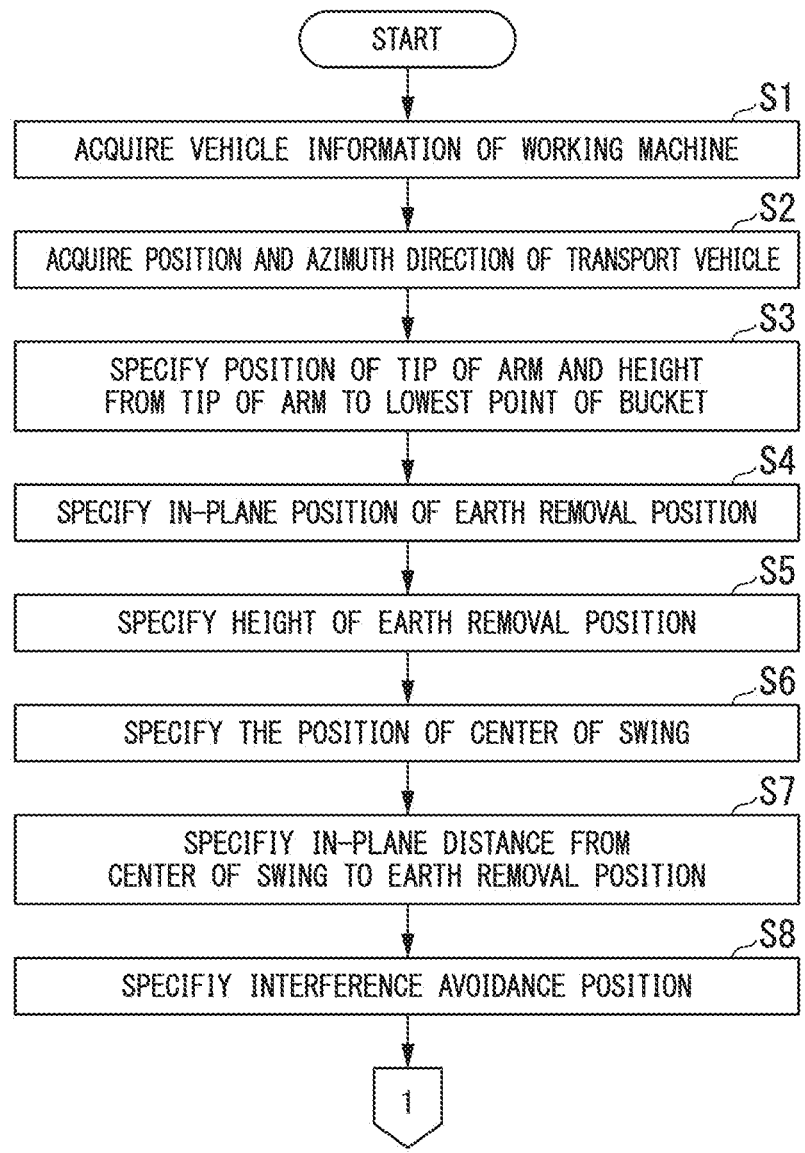
FIG. 7 is a first flowchart showing an automatic earth removal control method of the remote operation room according to the first embodiment.
Figure 8:
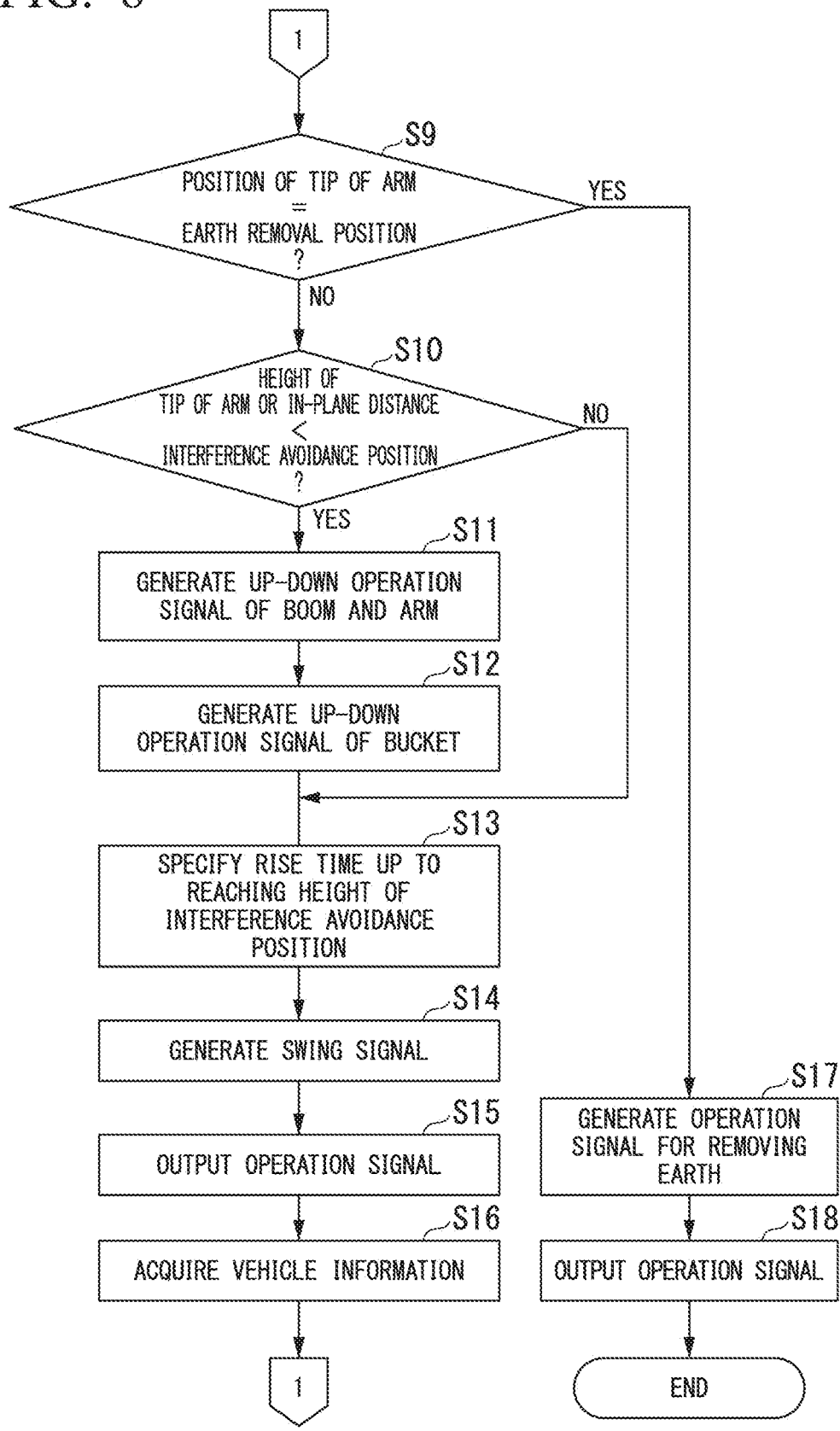
FIG. 8 is a second flowchart showing the automatic earth removal control method of the remote operation room according to the first embodiment.

FIG. 7 is a first flowchart showing an automatic earth removal control method of the remote operation room according to the first embodiment. FIG. 8 is a second flowchart showing the automatic earth removal control method of the remote operation room according to the first embodiment. If the control device 540 receives an earth removal instruction signal input from the operator, the control device 540 executes automatic earth removal control shown in FIG. 7.

The loading vehicle information acquisition unit 5101 acquires the position and azimuth direction of the swing body 120, the tilted angles of the boom 111, the arm 112, and the bucket 113, and the posture of the swing body 120 from the loading machine 100 (Step S1). The transport vehicle information acquisition unit 5103 acquires the position and azimuth direction of the transport vehicle 200 from the management device 300 (Step S2).

The bucket position-specifying unit 5105 specifies the position P of the tip of the arm 112 when an earth removal instruction signal is input, and a height from the tip of the arm 112 to the lowest point of the bucket 113, based on the vehicle information acquired by the loading vehicle information acquisition unit 5101 (Step S3). The bucket position-specifying unit 5105 specifies the position P and the excavation completion position P10.

The earth removal position-specifying unit 5106 converts the position information of the transport vehicle 200, which has been acquired by the transport vehicle information acquisition unit 5103, from the site coordinate system to the shovel coordinate system, based on the position, azimuth direction, and posture of the swing body 120 acquired in Step S1. The earth removal position-specifying unit 5106 specifies the in-plane position of the earth removal position P13 based on the position information and the azimuth direction information of the transport vehicle 200 acquired by the transport vehicle information acquisition unit 5103 and the known shape of the transport vehicle 200 (Step S4). At that time, the earth removal position-specifying unit 5106 specifies the height of the earth removal position P13 by adding the height Hb from the tip of the arm 112 to the lowest point of the bucket 113 specified in Step S3 and the control margin height of the bucket 113 to the known height Ht of the transport vehicle 200 (Step S5).

The avoidance position-specifying unit 5107 specifies the position of the center of swing of the swing body 120 based on the position and azimuth direction of the swing body 120 acquired by the loading vehicle information acquisition unit 5101 (Step S6). The avoidance position-specifying unit 5107 specifies an in-plane distance from the center of swing to the earth removal position P13 (Step S7). The avoidance position-specifying unit 5107 specifies a position which is apart by the specified in-plane distance from the center of swing, at which the exterior shape of the bucket 113 does not interfere with the transport vehicle 200 in plan view, and which is the closest from the earth removal position P13, as the interference avoidance position P12 (Step S8).

The operation signal generation unit 5109 determines whether or not the position of the tip of the arm 112 has reached the earth removal position P13 (Step S9). If the position of the tip of the arm 112 has not reached the earth removal position P13 (Step S9: NO), the operation signal generation unit 5109 determines whether or not the height of the tip of the arm 112 is less than the height of the interference avoidance position P12, or an in-plane distance from the center of swing of the swing body 120 to the tip of the arm 112 is less than an in-plane distance from the center of swing to the interference avoidance position P12 (Step S10). If the height of the bucket 113 is less than the height of the interference avoidance position P12 or the in-plane distance from the center of swing to the tip of the arm 112 is less than the in-plane distance from the center of swing to the interference avoidance position P12 (Step S10: YES), the operation signal generation unit 5109 generates operation signals for raising the boom 111 and the arm 112 to the height of the interference avoidance position P12 (Step S11). At that time, the operation signal generation unit 5109 generates the operation signals based on the positions and speeds of the boom 111 and the arm 112.

In addition, the operation signal generation unit 5109 calculates a sum of the angular speeds of the boom 111 and the arm 112 based on the operation signals generated for the boom 111 and the arm 112, and generates an operation signal for rotating the bucket 113 at the same speed as the angular speed (Step S12). Therefore, the operation signal generation unit 5109 is capable of generating the operation signal for maintaining the ground angle of the bucket 113. Note that in other embodiments, the operation signal generation unit 5109 may generate an operation signal for rotating the bucket 113 such that the ground angle of the bucket 113 calculated from detected values of the boom angle sensor 117, the arm angle sensor 118, and the bucket angle sensor 119 becomes equal to a ground angle when the automatic earth removal control has started.

If the height of the bucket 113 is greater than or equal to the height of the interference avoidance position P12 (Step S10: NO), the operation signal generation unit 5109 does not generate operation signals for the boom 111, the arm 112, and the bucket 113.

Subsequently, the operation signal generation unit 5109 specifies a rise time, which is the time taken for the height of the bucket 113 to reach the height of the interference avoidance position P12 from the excavation completion position P10 (Step S13). The operation signal generation unit 5109 generates a swing signal (Step S14). At that time, based on the rise time of the bucket 113, the operation signal generation unit 5109 generates the swing signal such that the tip of the arm 112 pass through the interference avoidance position P12 when swinging is performed after the height of the bucket 113 has become greater than or equal to the height of the interference avoidance position P12.

If at least one of the operation signals for the boom 111, the arm 112, and the bucket 113 and the swing signal for the swing body 120 is generated in the process from Step S9 to Step S14, the operation signal output unit 5110 outputs the generated operation signal to the loading machine 100 (Step S15). The loading vehicle information acquisition unit 5101 acquires vehicle information from the loading machine 100 (Step S16). Therefore, the loading vehicle information acquisition unit 5101 is capable of acquiring the vehicle information after the loading machine 100 has been driven according to the output operation signal. The control device 540 causes the process to return to Step S9 and repeats the generation of operation signals.

However, if the position of the tip of the arm 112 has reached the earth removal position P13 in Step S9 (Step S9: YES), the operation signal generation unit 5109 does not generate an operation signal. Therefore, if the position of the tip of the arm 112 reaches the earth removal position P13, the work equipment 110 and the swing body 120 come to a stop. If the position of the tip of the arm 112 has reached the earth removal position P13 (Step S9: YES), namely, the operation signal generation unit 5109 does not generate an operation signal in the process from Step S9 to Step S14, the operation signal generation unit 5109 generates an operation signal for removing earth from the bucket 113 (Step S17). Examples of the operation signal for removing earth from the bucket 113 are an operation signal for rotating the bucket 113 in an earth removal direction, or an operation signal for opening a clam when the bucket 113 is a clam bucket. The operation signal output unit 5110 outputs the generated operation signal to the loading machine 100 (Step S18). Then, the control device 540 ends the automatic earth removal control.

Herein, an operation of the loading machine 100 when automatic earth removal control is performed will be described using FIG. 6.

If the automatic earth removal control has started, the boom 111 and the arm 112 are raised from the excavation completion position P10 toward the position P11. At that time, the bucket 113 is driven so as to maintain an angle when excavation is to be completed.

If the tip of the arm 112 approaches the position P11, the swing body 120 starts swinging toward the earth removal position P13. At that time, since the tip of the arm 112 has not reached the height of the interference avoidance position P12, the boom 111 and the arm 112 continue to be raised. While the tip of the arm 112 is moved from the position P11 to the interference avoidance position P12, the boom 111, the arm 112, and the bucket 113 are decelerated such that the height of the tip of the arm 112 becomes equal to the height of the interference avoidance position P12.

If the tip of the arm 112 approaches the interference avoidance position P12, the driving of the work equipment 110 is stopped. On the one hand, the swing body 120 continues to swing. Namely, the tip of the arm 112 is not moved from the interference avoidance position P12 to the earth removal position P13 by the driving of the work equipment 110, but only by the swinging of the swing body 120. While the tip of the arm 112 is moved from the position P11 to the earth removal position P13, the swing body 120 decelerates such that the position of the tip of the arm 112 becomes the earth removal position P13.

If the tip of the arm 112 approaches the earth removal position P13, the driving of the work equipment 110 and the swing body 120 is stopped. Thereafter, the bucket 113 executes an earth removal operation.

The automatic earth removal control enables the loading machine 100 to automatically remove earth, which have been scooped by the bucket 113, to the transport vehicle 200. The operator repeats execution of excavation with the work equipment 110 and automatic earth removal control in response to the input of an earth removal instruction signal to the extent that the carrying capacity of the transport vehicle 200 does not exceed the maximum carrying capacity. Then, the operator inputs a departure instruction signal to the second operation device 531 by operating the second operation device 531. The departure instruction signal is transmitted from the second operation device 531 to the management device 300. Accordingly, the management device 300 generates course information containing the area of the exit path R4. The transport vehicle 200 departs from the loading point P3, travels along the exit path R4, and exits from the loading place A1.

<<Effects>>

According to the first embodiment, the control device 540 specifies an earth removal position for loading earth onto the transport vehicle 200, based on the position information and the azimuth direction information of the transport vehicle 200 detected by the transport vehicle 200. Therefore, the control device 540 is capable of automatically operating the loading machine 100 without the earth removal position being designated by the operator or the like.

In addition, according to the first embodiment, the control device 540 specifies the excavation completion position P10 of the bucket 113, and generates an operation signal for moving the bucket 113 from the excavation completion position P10 to the earth removal position P13. Therefore, the control device 540 is capable of automatically removing earth, which have been scooped by the bucket 113, to the transport vehicle 200.

In addition, according to the first embodiment, the control device 540 generates a control signal such that the bucket 113 is moved through the interference avoidance position P12. The interference avoidance position P12 according to the first embodiment is a position which has the same height as the height of the earth removal position P13, at which a distance from the center of swing of the swing body 120 is the same as the distance from the center of swing to the earth removal position P13 and at which the transport vehicle 200 is not present below the bucket 113 by taking the exterior shape of the bucket 113 into consideration. Therefore, it is possible to reliably prevent the bucket 113 from coming into contact with the transport vehicle 200 which is caused by the swinging of the swing body 120.

Second Embodiment

The loading machine 100 according to the first embodiment acquires position information and azimuth direction information of the transport vehicle 200 from the management device 300. However, the loading machine 100 according to a second embodiment includes a detection device detecting the spatial position of an object present in a detection direction, and acquires position information and azimuth direction information of the transport vehicle 200 based on the detection result of the detection device.

Therefore, the loading machine 100 is capable of acquiring the position information and the azimuth direction information of the transport vehicle 200 without relying on the management device 300.

Figure 9:
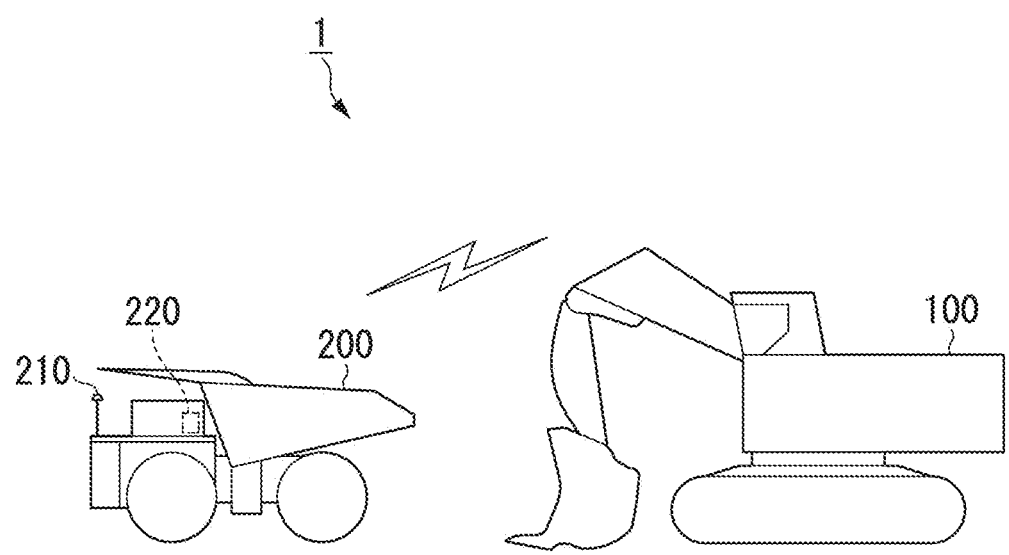
FIG. 9 is a schematic view showing the configuration of a remote operation system according to a second embodiment.

FIG. 9 is a schematic view showing the configuration of a remote operation system according to the second embodiment.

In the work system 1 according to the second embodiment, an operator gets on and operates the loading machine 100 and the transport vehicle 200. For this reason, the work system 1 according to the second embodiment does not include the management device 300 and the remote operation room 500.

<<Loading Machine>>

Figure 10:
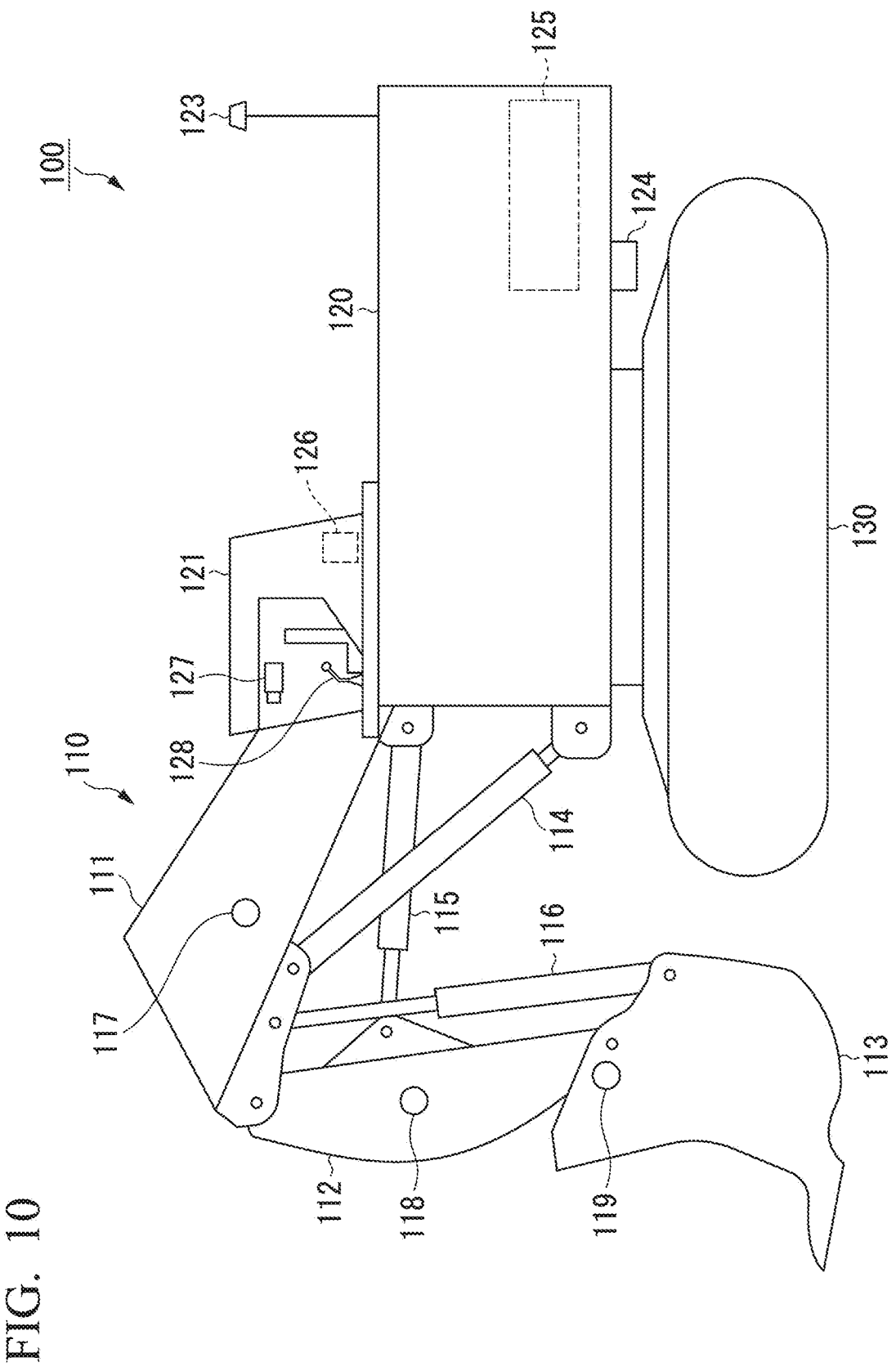
FIG. 10 is an exterior view of a loading machine according to the second embodiment.

FIG. 10 is an exterior view of a loading machine according to the second embodiment.

The loading machine 100 according to the second embodiment further includes a detection device 127 and an operation device 128 in addition to the configuration of the loading machine 100 according to the first embodiment. However, the loading machine 100 according to the second embodiment does not include the imaging device 122.

The detection device 127 detects the spatial position of an object present in a detection direction. Examples of the detection device 127 are a stereo camera, a laser scanner, or an ultra-wide band (UWB) distance-measuring unit. For example, the detection device 127 is provided such that the detection direction faces forward from the operation cab 121 of the loading machine 100. The detection device 127 specifies the spatial position of the object in a coordinate system having the position of the detection device 127 as a reference.

The operation device 128 is provided inside the operation cab 121. Examples of the operation device 128 are an operation lever and an operation panel. The operation device 128 according to the second embodiment receives inputs for operating the work equipment 110, the swing body 120, and the travel body 130 via the operation lever. In addition, the operation device 128 according to the second embodiment receives the input of an earth removal instruction signal via the operation panel.

Figure 11:
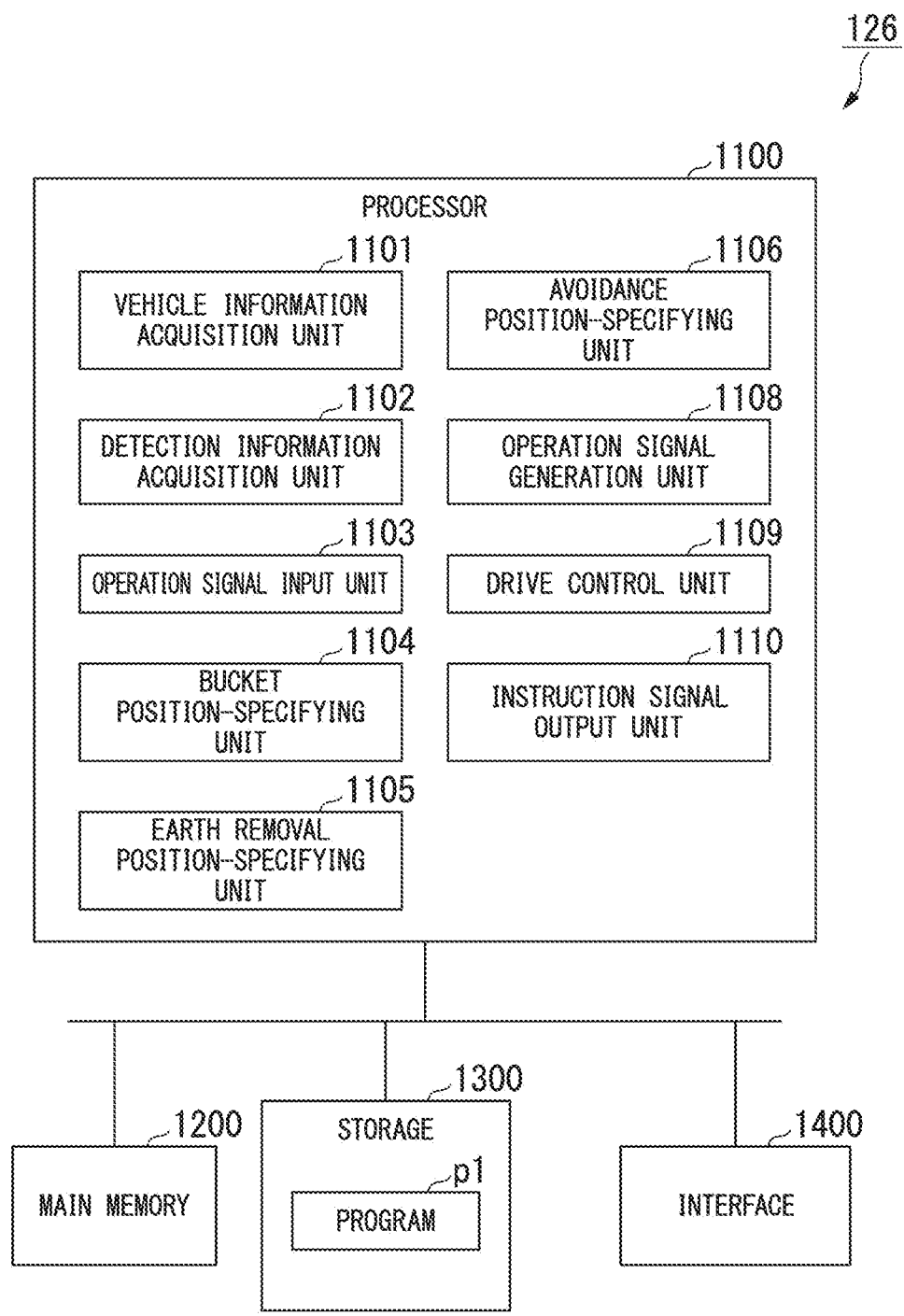
FIG. 11 is a schematic block diagram showing the configuration of a control device of the loading machine according to the second embodiment.

FIG. 11 is a schematic block diagram showing the configuration of a control device of the loading machine according to the second embodiment.

The control device 126 drives the work equipment 110, the swing body 120, or the travel body 130 based on an operation signal input to the operation device 128. In addition, the control device 126 recognizes the transport vehicle 200 and performs an automatic earth removal process, based on the vehicle information and detection information of the detection device 127.

The control device 126 is a computer including a processor 1100, a main memory 1200, a storage 1300, and an interface 1400. The storage 1300 stores a program p1. The processor 1100 reads out the program p1 from the storage 1300, loads the program p1 in the main memory 1200, and executes a process according to the program p1. The control device 126 is connected to the network via the interface 1400.

Examples of the storage 1300 are a HDD, a SSD, a magnetic disk, a magneto-optical disk, a CD-ROM, a DVD-ROM, or a semiconductor memory. The storage 1300 may be an internal medium directly connected to common communication lines of the control device 126, or may be an external medium connected to the control device 126 via the interface 1400. The storage 1300 is a non-transient storage medium.

The processor 1100 includes a vehicle information acquisition unit 1101, a detection information acquisition unit 1102, an operation signal input unit 1103, a bucket position-specifying unit 1104, an earth removal position-specifying unit 1105, an avoidance position-specifying unit 1106, an operation signal generation unit 1108, a drive control unit 1109, and an instruction signal output unit 1110 by the execution of the program p1.

The vehicle information acquisition unit 1101 acquires the position and azimuth direction of the swing body 120 from the position and azimuth direction calculator 123. The vehicle information acquisition unit 1101 acquires the swing speed and posture of the swing body 120 from the tilt measurement instrument 124. The vehicle information acquisition unit 1101 acquires the tilted angles of the boom 111, the arm 112, and the bucket 113 from the boom angle sensor 117, the arm angle sensor 118, and the bucket angle sensor 119, respectively.

The detection information acquisition unit 1102 acquires 3D data (for example, point cloud data, polygon data, or voxel data) indicating the spatial position of an object detected by the detection device 127.

The operation signal input unit 1103 receives the input of an operation signal and instruction signals (entry instruction signal and departure instruction signal) for the transport vehicle 200 from the operation device 128.

The bucket position-specifying unit 1104 specifies the excavation completion position P10 of the tip of the arm 112 and the height Hb from the tip of the arm 112 to the lowest point of the bucket 113 in the shovel coordinate system, based on the vehicle information acquired by the vehicle information acquisition unit 1101. The bucket position-specifying unit 1104 specifies the excavation completion position P10 and the height Hb by using a method similar to the method of the bucket position-specifying unit 5105 according to the first embodiment.

If an earth removal instruction signal has been input to the operation signal input unit 1103, the earth removal position-specifying unit 1105 specifies the earth removal position P13 based on the 3D data acquired by the detection information acquisition unit 1102. The earth removal position-specifying unit 1105 converts the spatial position of the object indicated by the 3D data from the coordinate system having an installation position of the detection device 127 as a reference to the shovel coordinate system, based on the position, azimuth direction, and posture of the swing body 120 acquired by the vehicle information acquisition unit 1101 and the known installation position of the detection device 127 on the swing body 120. The earth removal position-specifying unit 1105 specifies the position and azimuth direction of the transport vehicle 200 in the shovel coordinate system by applying the known shape of the transport vehicle 200 to the converted 3D data. The earth removal position-specifying unit 1105 specifies the earth removal point P22, which is apart by the distance D1 from the reference position P21 indicated by the position information of the transport vehicle 200 in a direction indicated by the azimuth direction information of the transport vehicle 200. The earth removal position-specifying unit 5106 specifies a position which is apart from the specified position P22 by a distance D2 from the center of the bucket 113 to the tip of the arm 112 in a facing direction of the swing body 120 of the loading machine 100, as an in-plane position of the earth removal position P13. The earth removal position-specifying unit 1105 specifies the height of the earth removal position P13 by adding the height Hb from the tip of the arm 112 to the lowest point of the bucket 113 specified by the bucket position-specifying unit 1104 and the control margin height of the bucket 113 to the height Ht of the transport vehicle 200.

The avoidance position-specifying unit 1106 specifies the interference avoidance position P12 based on the earth removal position P13 specified by the earth removal position-specifying unit 1105 and the position of the loading machine 100 acquired by the vehicle information acquisition unit 1101, by using a method similar to the method of the avoidance position-specifying unit 5107 according to the first embodiment.

The operation signal generation unit 1108 generates an operation signal for moving the bucket 113 to the earth removal position, based on the earth removal position specified by the earth removal position-specifying unit 1105 and the interference avoidance position specified by the avoidance position-specifying unit 1106, by using a method similar to the method of the operation signal generation unit 5109 according to the first embodiment.

The drive control unit 1109 drives the work equipment 110, the swing body 120, and the travel body 130 based on the operation signals input to the operation signal input unit 1103 and the operation signals generated by the operation signal generation unit 1108.

The instruction signal output unit 1110 transmits the instruction signals (entry instruction signal and departure instruction signal) input to the operation signal input unit 1103, to the management device 300.

<<Effects>>

The control device 540 according to the second embodiment includes the detection device 127 detecting the spatial position of an object present in the detection direction, and acquires the position information and the azimuth direction information of the transport vehicle 200 based on the detection result of the detection device 127. Therefore, the loading machine 100 according to the second embodiment is capable of acquiring the position information and the azimuth direction information of the transport vehicle 200 without relying on the management device 300, and automatically operating the loading machine 100 without the earth removal position being designated.

Other Embodiments

One embodiment has been described above in detail with reference to the drawings, but specific configurations are not limited to the above-mentioned configurations, and various design changes or the like can be made.

For example, in the first embodiment, the loading machine 100 to be remotely operated removes earth therefrom onto the transport vehicle 200 to be operated unmanned, and in the second embodiment, the loading machine 100 to be operated by an operator getting thereon removes earth therefrom onto the transport vehicle 200 to be operated by an operator getting thereon; however, the present invention is not limited thereto. For example, in other embodiments, the loading machine 100 to be remotely operated may remove earth therefrom onto the transport vehicle 200 to be operated by an operator getting thereon, or the loading machine 100 to be operated by an operator getting thereon may remove earth therefrom onto the transport vehicle 200 to be operated unmanned. Note that even in a case where the transport vehicle 200 is operated by an unmanned operation, as in the second embodiment, the loading machine 100 may acquire position information and azimuth direction information of the transport vehicle 200 based on the detection device 127. In addition, even in a case where the transport vehicle 200 is operated by an operator getting thereon, as in the first embodiment, the management device 300 may manage position information and azimuth direction information of the transport vehicle 200, and the loading machine 100 may acquire the information from the management device 300.

In the work system 1 according to the first embodiment, the control device 540 of the remote operation room 500 performs calculations of the automatic earth removal process based on the position information and the azimuth direction information of the transport vehicle 200 received from the management device 300; however, the present invention is not limited thereto. For example, in the work system 1 according to other embodiments, the control device 126 of the loading machine 100 may perform calculations of the automatic earth removal process based on the position information and the azimuth direction information of the transport vehicle 200 received from the management device 300. Namely, the detection information acquisition unit 1102 of the control device 126 according to the second embodiment may acquire the position information and the azimuth direction information of the transport vehicle 200 from the management device 300.

In addition, in the first embodiment, the loading machine 100 acquires the position and azimuth direction of the transport vehicle 200 via the management device 300; however, the present invention is not limited to thereto. For example, the loading machine 100 according to other embodiments, the position and azimuth direction of the transport vehicle 200 may be acquired from the transport vehicle 200 via inter-vehicle communication.

In the work system 1 according to the embodiments, the earth removal position P13 is specified based on the position information and the azimuth direction information when the transport vehicle 200 has stopped at the loading point P3; however, the present invention is not limited thereto. For example, in other embodiments, the earth removal position P13 may be specified based on not the position information and the azimuth direction information of the transport vehicle 200 but the position of the loading point P3. In this case, the work system 1 is capable of specifying the loading point P3 before the transport vehicle 200 stops.

In the embodiments, the loaded machine is the transport vehicle 200 which is a manned or unmanned vehicle; however, the present invention is not limited thereto. Other examples of the loaded machine are an in-pit crusher including a hopper and belt conveyor, or a self-propelled crusher including a hopper and a travel body. In this case, the earth removal position-specifying unit 5106 and the earth removal position-specifying unit 1105 are capable of specifying an earth removal position based on the position of the hopper of the loaded machine.

In the embodiments, the automatic earth removal control such as the earth removal position is handled in the shovel coordinate system, but may be handled in the site coordinate system.

Note that in the work system 1 according to the embodiments, the loading machine 100 loads earth, but in other embodiments, is not limited thereto. For example, a load target according to other embodiments may be ore, crushed stone, or coal.

In each of the control device 126, the management device 300, and the control device 540 according to the embodiments, the program is stored in the storage; however, the present invention is not limited thereto. For example, in other embodiments, a program may be delivered to a control device via communication lines. In this case, the control device which has received the delivery loads the program in a main memory and executes the process.

In addition, the program p1 and the program p5 may realize some of the above-mentioned functions. For example, each of the program p1 and the program p5 may realize the above-mentioned functions in combination with other programs already stored in the storage, or in combination with other programs mounted in other devices.

In addition, each of the control device 126, the management device 300, and the control device 540 may include a programmable logic device (PLD) in addition to the above-mentioned configuration or instead of the above-mentioned configuration. Examples of the PLD are a programmable array logic (PAL), a generic array logic (GAL), a complex programmable logic device (CPLD), or a field-programmable gate array (FPGA). In this case, some of the functions realized by the processor may be realized by the PLD.

INDUSTRIAL APPLICABILITY

The loading machine control device according to the present invention is capable of automatically operating the loading machine without designating the earth removal position.

The invention claimed is:

1. A loading machine control device that is configured to control a loading machine including a swing body and a work equipment attached to the swing body, the work equipment including a bucket, the loading machine control device comprising a processor that is configured to:
   acquire position information and azimuth direction information of a transport vehicle;
   determine an earth removal position for the loading machine to load a load target onto the transport vehicle based on the position information and the azimuth direction information;
   determine a position of the bucket based on receiving an input of an earth removal instruction signal for moving the bucket to the earth removal position; and
   generate an operation signal for moving the bucket from the determined position of the bucket to the earth removal position.

2. The loading machine control device according to claim 1, wherein the processor is further configured to:
   determine an interference avoidance position that is located at a height equal to a height of the earth removal position, wherein a distance from a center of swing of the swing body to the interference avoidance position is equal to a distance from the center of swing to the earth removal position, and the transport vehicle is not present below the interference avoidance position of the bucket; and
   based on the bucket having reached the interference avoidance position, generate the operation signal for driving only the swing body.

3. The loading machine control device according to claim 2, wherein the processor is configured to generate an operation signal for driving both of the swing body and the work equipment to move the bucket to the interference avoidance position.

4. The loading machine control device according to claim 1, wherein the processor is configured to acquire the position information and the azimuth direction information that are detected by the transport vehicle.

5. The loading machine control device according to claim 1, wherein the loading machine further includes a detection device configured to detect a spatial position of an object present in a detection direction, and wherein the processor is configured to acquire the position information and the azimuth direction information based on a detection result of the detection device.

6. The loading machine control device according to claim 1, wherein the earth removal instruction signal is input by an operation of an operator.

7. The loading machine control device according to claim 1, wherein the earth removal position includes a vertical position of the bucket relative to the transport vehicle.

8. A method for controlling a loading machine including a swing body and a work equipment attached to the swing body, the working equipment including a bucket, the method comprising:
   acquiring position information and azimuth direction information of a transport vehicle; and
   outputting an operation signal for moving the bucket to an earth removal position for the loading machine to load a load target onto the transport vehicle based on the position information and the azimuth direction information.

9. The method of claim 8, further comprising:
   determining the earth removal position for the loading machine to load the load target onto the transport vehicle based on the position information and the azimuth direction information;
   determining a position of the bucket based on receiving an input of an earth removal instruction signal for moving the bucket to the earth removal position;
   determining an interference avoidance position that is located at a height equal to a height of the earth removal position, wherein a distance from a center of swing of the swing body to the interference avoidance position is equal to a distance from the center of swing to the earth removal position, and the transport vehicle is not present below the interference avoidance position of the bucket; and
   based on the bucket having reached the interference avoidance position, outputting the operation signal for driving the swing body to move the bucket from the interference avoidance position to the earth removal position.

10. The method of claim 9, further comprising:
    driving both of the swing body and the work equipment to move the bucket from an excavation completion position to the interference avoidance position.

* * * * *